(12) United States Patent
Choi et al.

(10) Patent No.: US 9,510,063 B2
(45) Date of Patent: Nov. 29, 2016

(54) FUNCTIONALITY EXTENDING KIT OF DISPLAY APPARATUS AND CONTROLLING METHOD THEREOF

(71) Applicant: SAMSUNG ELECTRONICS CO., LTD., Suwon-si (KR)

(72) Inventors: Young-ho Choi, Suwon-si (KR); Sang-min Lim, Yongin-si (KR); Hee-yoel Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/291,548

(22) Filed: May 30, 2014

(65) Prior Publication Data

US 2014/0359690 A1    Dec. 4, 2014

(30) Foreign Application Priority Data

Jun. 3, 2013 (KR) .......... 10-2013-0063749

(51) Int. Cl.
| | | |
|---|---|---|
| H04N 21/418 | (2011.01) | |
| H04N 5/63 | (2006.01) | |
| H04N 5/64 | (2006.01) | |
| H04N 21/81 | (2011.01) | |

(Continued)

(52) U.S. Cl.
CPC .... H04N 21/8186 (2013.01); H04N 21/26291 (2013.01); H04N 21/418 (2013.01); H04N 21/44231 (2013.01); H04N 5/63 (2013.01); H04N 5/64 (2013.01); H04N 21/4383 (2013.01); H04N 21/4436 (2013.01); H04N 21/4586 (2013.01)

(58) Field of Classification Search
None
See application file for complete search history.

(56) References Cited

U.S. PATENT DOCUMENTS

| | | | |
|---|---|---|---|
| 6,950,520 B1* | 9/2005 | Ryan ...................... | H04N 5/913 348/E7.056 |
| 7,080,039 B1* | 7/2006 | Marsh ..................... | G06F 21/10 380/201 |

(Continued)

FOREIGN PATENT DOCUMENTS

| | | | | |
|---|---|---|---|---|
| CN | 103186167 A | * | 7/2013 | ........... G09G 9/2096 |
| JP | 2010-502115 A | | 1/2010 | |

(Continued)

OTHER PUBLICATIONS

Search Report dated Oct. 1, 2014 issued by the International Searching Authority in counterpart International Patent Application No. PCT/KR2014/004952 (PCT/ISA/210).

(Continued)

*Primary Examiner* — Nasser Goodarzi
*Assistant Examiner* — Terrika Peterson
(74) *Attorney, Agent, or Firm* — Sughrue Mion, PLLC

(57) ABSTRACT

Provided herein is a functionality extending kit of a display apparatus, the kit including a receiver which enables content to be viewed using an inserted card; a tuner configured to tune to a channel; an extending connector including a standard pin area connected to a signal line of a standard card and an additional pin area connected to a predetermined signal line; and a controller configured to control the tuner to tune to a channel that may transmit firmware update data associated with the card when the display apparatus connected to the extending connector is at a picture off state; wherein the functionality extending kit receives standby power from the display apparatus through a power pin provided in the additional pin area.

20 Claims, 10 Drawing Sheets

(51) Int. Cl.

| | |
|---|---|
| *H04N 21/262* | (2011.01) |
| *H04N 21/442* | (2011.01) |
| *G06F 1/16* | (2006.01) |
| *H04N 5/44* | (2011.01) |
| *H04N 5/913* | (2006.01) |
| *G06F 21/10* | (2013.01) |
| *G06F 13/00* | (2006.01) |
| *H04N 21/458* | (2011.01) |
| *H04N 21/438* | (2011.01) |
| *H04N 21/443* | (2011.01) |

(56) References Cited

U.S. PATENT DOCUMENTS

| | | | |
|---|---|---|---|
| 7,221,410 B2 | 5/2007 | Choi et al. | |
| 7,992,184 B2 | 8/2011 | Doumuki | |
| 8,108,889 B2 | 1/2012 | Takatori | |
| 8,544,047 B2 | 9/2013 | Tu et al. | |
| 2002/0026501 A1* | 2/2002 | Hoang | H04N 7/17318 |
| | | | 709/219 |
| 2002/0059600 A1* | 5/2002 | Matsumoto | H04N 5/44543 |
| | | | 725/40 |
| 2004/0165119 A1* | 8/2004 | Choi | H04N 5/44 |
| | | | 348/839 |
| 2004/0193764 A1 | 9/2004 | Watanabe | |
| 2004/0218911 A1 | 11/2004 | Grimes | |
| 2005/0281407 A1* | 12/2005 | Lee | H04L 25/03866 |
| | | | 380/210 |
| 2006/0174259 A1* | 8/2006 | Kim | H04N 7/163 |
| | | | 725/6 |
| 2007/0022179 A1* | 1/2007 | Kim | G06F 8/65 |
| | | | 709/217 |
| 2009/0138720 A1* | 5/2009 | Jeong | H04L 63/0823 |
| | | | 713/176 |
| 2010/0013551 A1* | 1/2010 | Reams | H04N 5/4403 |
| | | | 327/544 |
| 2010/0115547 A1* | 5/2010 | Choi | H04N 7/163 |
| | | | 725/31 |
| 2010/0157706 A1* | 6/2010 | Cho et al. | 365/203 |
| 2011/0099578 A1* | 4/2011 | Kim et al. | 725/40 |
| 2012/0290758 A1* | 11/2012 | Canter | G06F 13/00 |
| | | | 710/301 |
| 2013/0164984 A1* | 6/2013 | Zhou | G09G 3/2096 |
| | | | 439/620.15 |
| 2013/0279694 A1* | 10/2013 | Gremaud | H04N 21/4181 |
| | | | 380/211 |
| 2014/0123185 A1* | 5/2014 | Nam | H04N 21/4394 |
| | | | 725/38 |
| 2014/0357104 A1* | 12/2014 | Choi et al. | 439/78 |
| 2014/0359690 A1* | 12/2014 | Choi | H04N 21/26291 |
| | | | 725/132 |

FOREIGN PATENT DOCUMENTS

| | | |
|---|---|---|
| KR | 10-2004-0052291 A | 6/2004 |
| KR | 10-0480037 B1 | 3/2005 |
| KR | 10-2006-0079228 A | 7/2006 |
| KR | 10-2006-0120721 A | 11/2006 |
| KR | 10-2010-0069690 A | 6/2010 |
| KR | 10-2013-0088712 A | 8/2013 |

OTHER PUBLICATIONS

Written Opinion dated Oct. 1, 2014 issued by the International Searching Authority in counterpart International Patent Application No. PCT/KR2014/004952 (PCT/ISA/237).

\* cited by examiner

FUNCTIONALITY EXTENDING KIT OF DISPLAY APPARATUS AND CONTROLLING METHOD THEREOF

CROSS-REFERENCE TO RELATED APPLICATIONS

This application claims priority from Korean Patent Application No. 10-2013-0063749, filed in the Korean Intellectual Property Office (KIPO) on Jun. 3, 2013, the contents of which are incorporated herein by reference in their entirety.

BACKGROUND OF THE INVENTION

1. Field of the Invention

Methods and apparatuses consistent with the exemplary embodiments relate to a functionality extending kit and control method thereof, and more particularly, to a functionality extending kit that may reduce the need for additional devices while reducing power consumption in a display apparatus, and a control method thereof.

2. Description of Related Art

Due to technological development of electronics and heightened living standards, there are an increasing number of households that have a plurality of electronic devices. In addition, due to development of broadcasting technologies, broadcasting contents may be provided according to various methods such as public TV networks, satellite broadcasting, and cable broadcasting, etc. In order to view a cable broadcasting or satellite broadcasting via a display apparatus, the user has to use the SetTop Box (STB) provided by each operator of each method. When a display apparatus is installed in each of a plurality of rooms in each household, in order for every family member to view a satellite broadcasting or cable broadcasting via a display apparatus, a number of SetTop Boxes equal to the number of display apparatuses may be required. Therefore, there are many disadvantages in terms of space and cost.

In addition, for a user to view a scrambled channel, there are many instances where the user must install an additional card embedded with a Conditional Access System (CAS) card such as Common Interface Plus (CI+) card in Europe or a cable card in the USA. Since the display apparatus needs up to date firmware for the card even in picture off states, permanent power (for example, B+ power) must be supplied to a tuner, controller, and card inside the display apparatus. Therefore, there are many disadvantages in terms of power consumption.

Therefore, there is an increasing demand for a functionality extending kit that may easily assist and extend the functions of a display apparatus.

SUMMARY

One or more exemplary embodiments provide a functionality extending kit of a display apparatus and a control method thereof that may assist and extend functions of the display apparatus with ease.

According to an exemplary embodiment there is provided a functionality extending kit, the kit comprising: a receiver configured to receive a card that enables content to be viewed an extending connector comprising a first pin area connected to a signal line of a communication card and an additional pin area connected to a predetermined signal line; and a controller configured to control a tuner to tune to a channel that transmits firmware update data associated with the card when the display apparatus is at a picture off state; and the functionality extending kit of the display apparatus is configured to receive standby power from the display apparatus through a pin provided in the additional pin area.

In addition, the functionality extending kit of the display apparatus may further comprise a switch configured to connect the receiver to either the controller or the display apparatus.

Meanwhile, the controller may be configured to control the switch to connect the receiver to the controller when the display apparatus is at a picture off state, and is configured to control the switch to connect the receiver to the display apparatus when the display apparatus is at a picture on state.

In addition, the controller may be configured to be controlled by the display apparatus when the display apparatus is at a picture on state.

In addition, the controller may be configured to transceive a control signal to/from the display apparatus through a control pin provided in the additional pin area.

Meanwhile, the functionality extending kit of the display apparatus may further include a communicator configured to communicate with a network.

In addition, the communicator may be at least one of MoCA (Multimedia over Coax Alliance), power line communication, and LAN (Local Area Network) card.

According to an exemplary embodiment there is provided a functionality extending kit control method, the method comprising: receiving standby power from the display apparatus through a power pin provided in an additional pin area of an extending connector; and tuning to a channel that transmits firmware update data associated with a card which enables content to be viewed when the display apparatus is at a picture off state.

Meanwhile, the selectively connecting may involve connecting the receiver to the controller when the display apparatus is at a picture off state, and connecting the receiver to the display apparatus when the display apparatus is at a picture on state.

The functionality extending kit controlling method of a display apparatus may further comprise being controlled by the display apparatus when the display apparatus is at a picture on state.

The functionality extending kit controlling method of a display apparatus may further comprise transceiving a control signal to/from the display apparatus through a control pin provided in the additional pin area.

In addition, the functionality extending kit controlling method of a display apparatus may further comprise communicating with a network using at least one of MoCA (Multimedia over Coax Alliance), power line communication, and LAN (Local Area Network).

According to an exemplary embodiment there is provided a functionality extending kit, including a connector configured to be attached to a display apparatus, a receiver configured to receive a card, and a tuner configured to tune to a channel which transmits firmware update data associated with the card, wherein the functionality extending kit is configured to obtain the firmware update data while receiving standby power from the display apparatus.

The functionality extending kit may further include a power unit configured to receive standby power from the display apparatus when the display apparatus at a picture off state.

In addition, the standby power may be received through a power pin provided in an additional pin area of an extending connector.

Further, the extending connector may be a PCMCIA connector.

The functionality extending kit may include a decoder configured to decode a scrambled signal received at the tuner.

The functionality extending kit may include a communicator configured to transmit data received from the display apparatus to a server through a network and to transmit data received through the network to the display apparatus.

As aforementioned, according to the various exemplary embodiments of the present disclosure, the functionality extending kit of the display apparatus may easily assist and extend the functions of the display apparatus.

BRIEF DESCRIPTION OF THE DRAWINGS

The above and/or other aspects of the exemplary embodiments will be more apparent from the following detailed description with reference to the accompanying drawings, in which.

DETAILED DESCRIPTION

Figure 1:
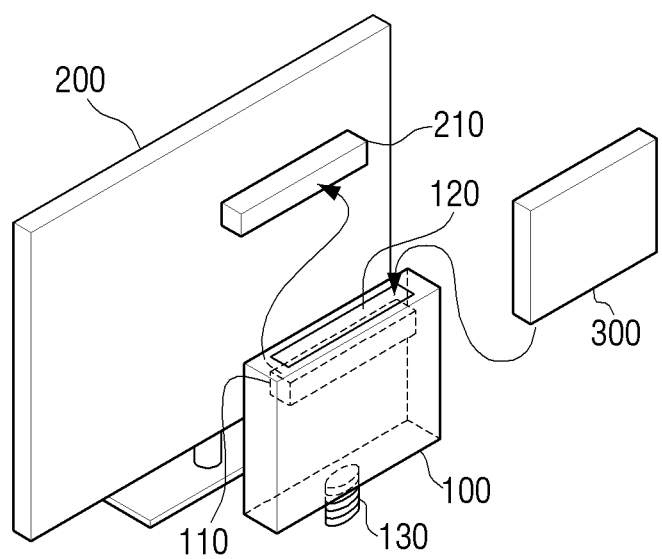
FIG. 1 is a view illustrating the connection between a functionality extending kit of a display apparatus and the display apparatus according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view of an exemplary embodiment illustrating the connection of a functionality extending kit of a display apparatus and the display apparatus.

The exemplary embodiment shown in FIG. 1 illustrates a functionality extending kit 100, display apparatus 200, and card 300 (e.g., a TV card). The functionality extending kit 100 may comprise an extending PCMCIA connector 110, inserter 120, and tuner 130.

PCMCIA is an acronym of the Personal Computer Memory Card International Association, who defined and developed the PCMCIA standard. The acronym previously was used to refer to a memory card. However, the PCMCIA standard is no longer limited to memory apparatuses. PCMCIA cards may be broadly classified into type I through type IV cards. Of these, a type II has a 16/32 bit interface, and may be used in modems, LAN cards, and TV receiving cards. A standard PCMCIA interface used in TV cards may consist of 68 signal lines.

The extending PCMCIA connector 110 may comprise a standard PCMCIA pin area that is connected to a standard PCMCIA interface and an additional pin area that is connected to an additional PCMCIA interface. For example, the standard PCMCIA pin area may comprise 68 pins, while the additional pin area may comprise 24 pins. In this case, the extending PCMCIA connector 110 may comprise 92 pins. The standard PCMCIA pin area may be used for communication between the card 300 and the display apparatus 200, while the additional pin area may be used for additional functions of the functionality extending kit 100.

The card 300 may be inserted into the inserter 120 (e.g., a receiver or receiving unit). When the card 300 is inserted into the inserter 120 and the functionality extending kit 100 is connected to the display apparatus 200, the display apparatus 200 may communicate with the card 300, receive broadcasting contents of a scrambled channel through the card, and display the received broadcasting contents.

The tuner 130 may tune to a channel. The display apparatus 200 may be connected to the functionality extending kit 100 through an extending PCMCIA connector 210. The display apparatus 200 may be connected to the card 300 through a card slot of a standard PCMCIA connector or a standard PCMCIA interface. In this configuration, when the display apparatus 200 is connected to another apparatus performing additional functions, the display apparatus 200 may include an additional connector. However, when the display apparatus 200 includes the extending PCMCIA connector 210, additional functions may be performed through the additional area of the extending PCMCIA connector 210. Therefore, the display apparatus 200 doesn't need an additional connector.

By way of example, the display apparatus 200 may be embodied as a digital TV, tablet personal computer (PC), notebook, laptop computer, and digital frame, etc.

The card 300 may enable a user to view paid broadcastings (e.g., pay-per-view content). A broadcasting contents provider may encode broadcasting contents and transmit the encoded broadcasting contents so that only allowed users can view the paid broadcasting contents. The card 300 may be provided from the broadcasting contents provider, and may be used to descramble a scrambled channel, thereby enabling the user to view paid broadcasting contents. Examples of card 300 that are used in US type display apparatuses may be referred to as cable cards, whereas such cards used in Europe type display apparatuses may be referred to as CI+ cards.

The display apparatus 200 and card 300 may be connected to each other using the functionality extending kit 100. Hereinbelow is explanation of a configuration of the functionality extending kit 100 according to an exemplary embodiment.

Figure 2:
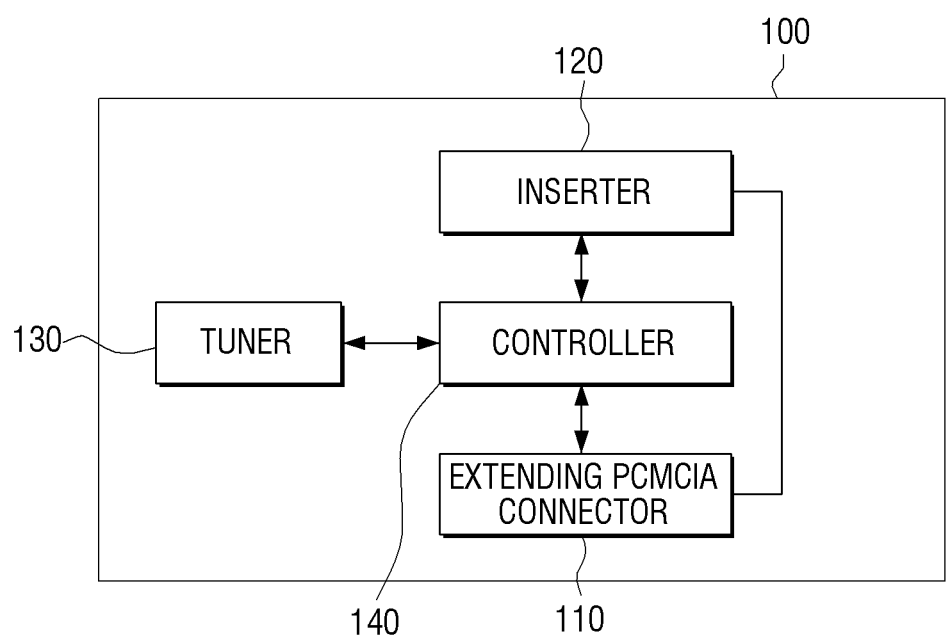
FIG. 2 is a block diagram of a functionality extending kit of a display apparatus according to an exemplary embodiment.

FIG. 2 is a block diagram of a functionality extending kit 100 of a display apparatus 200 according to an exemplary embodiment. With reference to FIG. 2, the functionality extending kit 100 may comprise an extending PCMCIA connector 110, inserter 120, tuner 130, and controller 140.

The extending PCMCIA connector 110 may comprise a standard PCMCIA pin area that is connected to the signal line of the standard PCMCIA card and an additional pin area that is connected to a predetermined signal line. The extending PCMCIA connector 110 will be explained in detail hereinbelow according to an exemplary embodiment.

A card for enabling viewing paid broadcasting may be inserted into the inserter 120. The inserter 120 may be connected to the standard PCMCIA pin area of the extending PCMCIA connector 110 through the standard PCMCIA interface. In addition, the card 300 may also include the standard PCMCIA interface. Therefore, when the card 300 is inserted into the inserter 120, and the functionality extending kit 100 is connected to the display apparatus 200, the card 300 is connected to the display apparatus 200 through the standard PCMCIA interface.

The tuner 130 may tune broadcasting channels. The display apparatus 200 may additionally include a tuner. Therefore, the tuner of the display apparatus 200 may be used to tune public TV broadcasting channels, while the tuner 130 of the functionality extending kit 100 may be used to tune encoded channels such as cable broadcasting channels or satellite broadcasting channels.

In addition, when picture display of the display apparatus 200 is at a screen picture off state (e.g., in a standby mode, not currently displaying an output image, etc.), the tuner 130 may tune to channels that may receive firmware update data corresponding to a card 300 inserted into the inserter 120. Cards which descramble scrambled broadcasting channels may need firmware updates. However, the channels that may receive firmware update data are not always the same. Therefore, the tuner 130 needs to tune the channels that may transmit the firmware update data.

A screen picture off state of the display apparatus 200 may refer to a state where power is supplied to a limited number of parts of the display apparatus 200 and/or where the output of the display apparatus 200 is turned off. For example, at a picture off state, the display apparatus 200 may only supply power to a sensor and controller in order to receive input signals of a remote control. In addition, the display apparatus 200 may supply power to the controller 140, tuner 130, and card 300 in order to perform the firmware update as mentioned above. In commonly used display apparatuses, the power supplied to the controller, etc. may remain at a permanent power(for example B+ power) and thus approximately 15 W of power consumption occurs at a picture off state.

However, when the functionality extending kit 100 is used, the functionality extending kit 100 may receive standby power from the display apparatus 200 when the picture display of the display apparatus 200 is at a picture off state. Using the standby power supplied, the functionality extending kit 100 may perform the card firmware update, and approximately 6 W power may be consumed in the display apparatus 200. Therefore, the functionality extending kit 100 may reduce the power consumption of the display apparatus 200 when the display apparatus 200 is at a picture off state.

The controller 140 may control the tuner 130 and the inserter 120 in order to perform a firmware update operation when the display apparatus 200 is at a picture off state.

In another exemplary embodiment, the functionality extending kit 100 may not provide its own power. Therefore, the functionality extending kit 100 may be supplied with power from the display apparatus 200 when connected to the display apparatus 200. The power that the functionality extending kit 100 receives may be standby power provided from the display apparatus 200.

Figure 3:
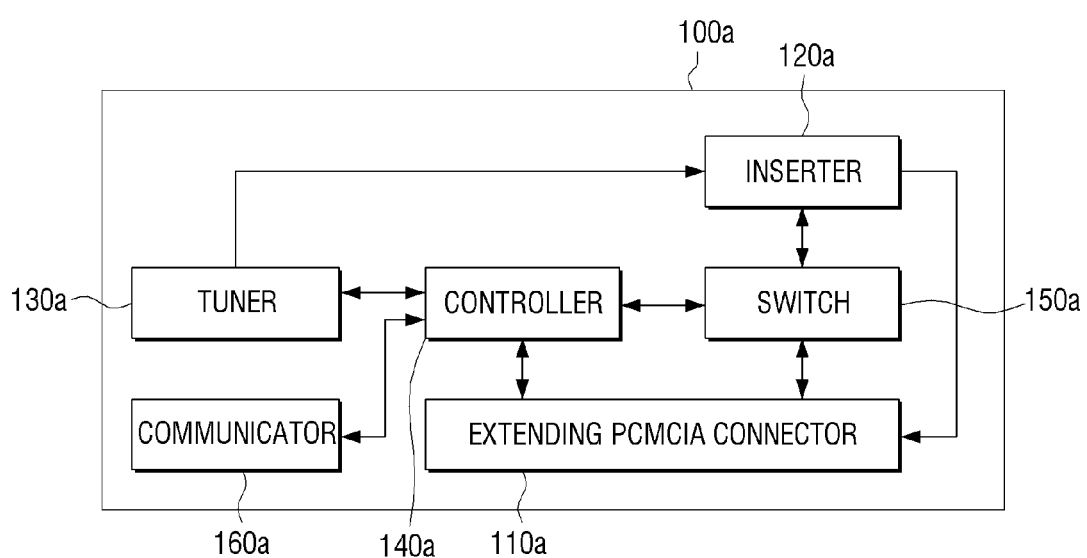
FIG. 3 is a block diagram of a functionality extending kit of a display apparatus according to an exemplary embodiment.

FIG. 3 is a block diagram of a functionality extending kit of a display apparatus according to an exemplary embodiment.

With reference to FIG. 3, the functionality extending kit 100a may include an extending PCMCIA connector 110a, inserter 120a, tuner 130a, controller 140a, switch 150a, and communicator 160a. The extending PCMCIA connector 110a, inserter 120a, and tuner 130a are the same as explained with reference to FIG. 2 earlier on, and thus further explanation is omitted.

The switch 150a may be selectively connected to the inserter 120a to which the card 300 is inserted to the controller 140a or the display apparatus 200. For example, when the display apparatus 200 is at a picture on state (e.g., when display apparatus is displaying an output image), the switch 150a may connect the inserter 120a to the display apparatus 200. The contents of a scrambled broadcasting channel tuned in the tuner 130a may be descrambled using the card 300 which is inserted into the inserter 120a. The descrambled broadcasting contents may be transmitted to the display apparatus 200 through the standard PCMCIA pin area of the extending PCMCIA connector 110a. The display apparatus may display the received broadcasting contents. A picture display state of the display apparatus 200 may mean the state of displaying broadcasting contents. Therefore, when the display apparatus 200 is at a picture on state, the functionality extending kit 100a may be controlled by the display apparatus 200.

When the display apparatus 200 is at a picture off state, the switch 150a may connect the controller 140a and the inserter 120a and update the firmware of the card 300. The controller 140a may control the switching operation of the switch 150a.

The communicator 160a may communicate with a network. For example, the communicator 160a may be at least one of MoCA (Multimedia over Coax Alliance), power line communication modem, LAN card, or the like.

MoCA (Multimedia over Coax Alliance) may refer to a method of using a coaxial cable for connecting home appliances or home network devices. MoCA may transmit all data communication, audio/video stream, etc. A MoCA Ethernet bridge may be used to connect the display apparatus 200 to a multimedia network. However, MoCA must be connected to every display apparatus 200 installed in each room, and in the case of installing a SetTop Box together with each display apparatus 200, both MoCA and STB must be installed for each display apparatus 200 in each room. Thus, it is disadvantageous in terms of space and cost. However, a functionality extending kit 100a including the communicator 160a may overcome the aforementioned disadvantages. A power line communication modem may connect the display apparatus 200 to the network through power lines, and the LAN card may connect the display apparatus to the network either by a wired connection or wirelessly.

Hereinbelow is explanation on the operation of the display apparatus at a picture on state and picture off state according to an exemplary embodiment.

Figure 4:
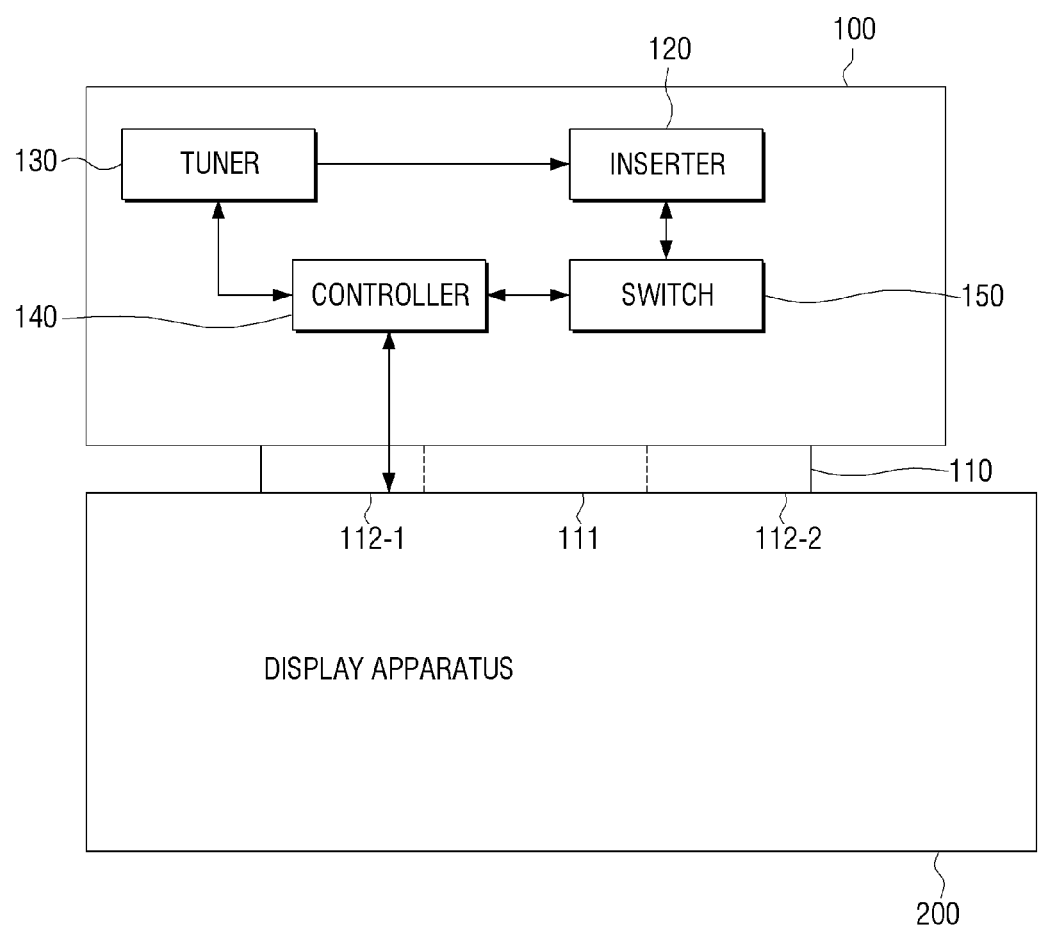
FIG. 4 is a view illustrating the operation of a display apparatus at a picture off state according to an exemplary embodiment.

FIG. 4 is a view explaining the operation of the display apparatus at a picture off state according to an exemplary embodiment.

With reference to FIG. 4, the functionality extending kit 100 may be connected to the display apparatus 200. The card 300 may be inserted into the inserter 120 of the functionality extending kit 100. The display apparatus 200 may be in a picture display off state. The functionality extending kit 100 may communicate with the display apparatus 200 using the additional pin area 112-1 of the extending PCMCIA connector 110. For example, the functionality extending kit 100 may perform communication with the display apparatus 200 using a Universal Asynchronous Receiver/Transmitter (UART).

That is, the functionality extending kit 100 may communicate with the display apparatus 200 and determine whether or not the screen is at a picture off state or picture on state. The standard PCMCIA pin area 111 of the functionality extending kit 110 may be used for communication and data transmission between the card 300 and the display apparatus 200, and thus signals related to additional functions may be transmitted through additional pin areas 112-1, 112-2.

The extending PCMCIA connector 110 may be divided into standard PCMCIA pin area 110 and additional pin areas 112-1, 112-2. However, each of these pin areas need not exist separately. That is, the extending PCMCIA connector 110 may exist as one connector. A signal line interface allocated to a pin of the connector may be differentiated as either a standard PCMCIA interface or an additional PCMCIA interface.

When picture display of the display apparatus 200 is at a picture off state, the switch 150 may connect the controller 140 and the inserter 120. The controller 140 may control the tuner 130 and tune to channels that may transmit card firmware update data. The tuner 130 may tune to channels that transmit firmware update data, and may receive the firmware update data and transmit the received firmware update data to the card 300 inserted into the inserter 120. The controller 140 may control the card 300 inserted into the inserter 120 so as to update the firmware of the card 300.

Figure 5:
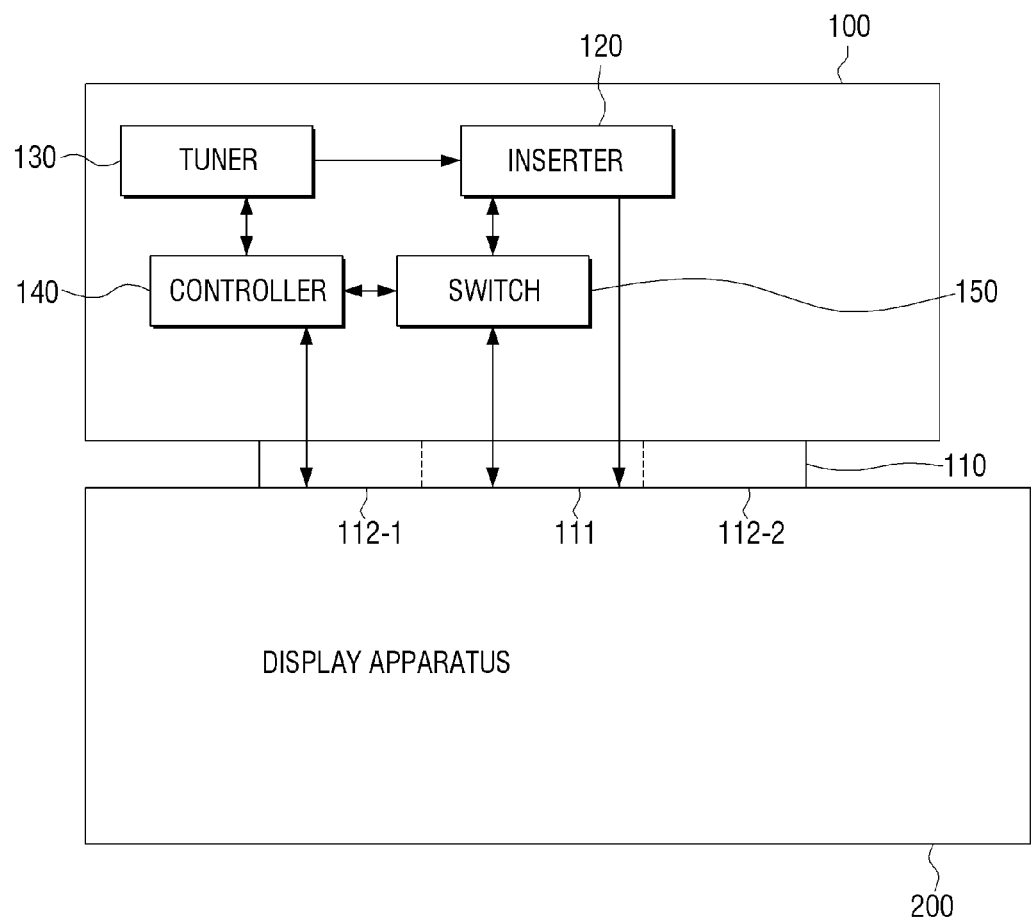
FIG. 5 is a view illustrating the operation of a display apparatus at a picture on state according to an exemplary embodiment.

FIG. 5 is a view illustrating the operation of the display apparatus at a picture on state according to an exemplary embodiment.

With reference to the exemplary embodiment of FIG. 5, the display apparatus 200 is at a picture on state. The functionality extending kit 100 may communicate with the display apparatus 200 through the additional pin area 112-1 of the extending PCMCIA connector 110 and may determine a state of the display apparatus 200. The controller 140 may control the switch 150 and connect the card inserted into the inserter 120 and the display apparatus 200.

The functionality extending kit 100 may receive a control signal from the display apparatus 200 through the additional pin area 112-1 of the extending PCMCIA connector 110. For example, when the display apparatus 200 receives a channel selection command as input, the input command may be transmitted to the functionality extending kit 100. The tuner 130 of the functionality extending kit 100 may tune the channel selected by the user by the control of the display apparatus.

The tuner 130 may receive scrambled broadcasting contents from a selected channel and transmit the received scrambled broadcasting contents to the card 300 inserted into the inserter 120. The card may descramble the broadcasting contents and transmit the descrambled broadcasting contents to the display apparatus 200. The display apparatus 200 may transmit a control signal related to descrambling the broadcasting contents to the card of the inserter 120 through the switch 150. That is, an operation of receiving the broadcasting contents and descrambling of the broadcasting contents may be directly controlled by the display apparatus 200.

As such, when the display apparatus 200 is not displaying an image, the functionality extending kit 100 may be controlled by the display apparatus 200.

The communication between the functionality extending kit 100 and the display apparatus 200 may be made through the extending PCMCIA connector 110. Hereinbelow is explanation on the extending PCMCIA connector.

Figure 6:
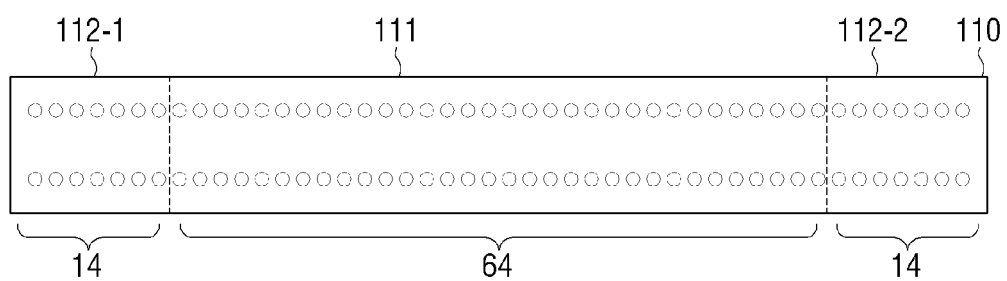
FIG. 6 is a view illustrating an extending PCMCIA connector according to an exemplary embodiment.

FIG. 6 is a view illustrating an extending PCMCIA connector according to an exemplary embodiment.

FIG. 6 illustrates the extending PCMCIA connector 110. As illustrated in FIG. 6, the standard PCMCIA pin area 111 that may be connected to the standard PCMCIA signal line is disposed in a central portion, and the additional pin areas 112-1, 112-2 connected to the predetermined signal line may be disposed at both sides of the additional pin areas 112-1, 112-2 connected to a predetermined signal line. Otherwise, the standard PCMCIA pin area 111 may be disposed at one side of the extending PCMCIA connector 110, and the additional pin areas 112-1, 112-2 may be disposed at the other side.

In an exemplary embodiment, the extending PCMCIA connector 110 may include 92 pins. A general standard PCMCIA pin area includes 68 pins. Therefore, the additional pin areas may include 24 pins. In an exemplary embodiment, some pins of the standard PCMCIA pin area may be allocated to an extending area so as to further utilize the extending area.

In the extending PCMCIA connector 110 illustrated in FIG. 6, 4 pins of the pins of the standard PCMCIA pin area are allocated to the extending area. Therefore, 64 standard PCMCIA pin areas 111 may be disposed at the central portion of the extending PCMCIA connector 110, and 28 additional pin areas 112-1, 112-2 may be divided into a first and second additional pin areas 112-1, 112-2 each comprising 14 pins disposed at both sides.

The extending PCMCIA connector 110 illustrated in FIG. 6 may have the shape of a female connector, and the pin areas may be disposed in the same manner for the male connector that corresponds to the female connector.

Figure 7:
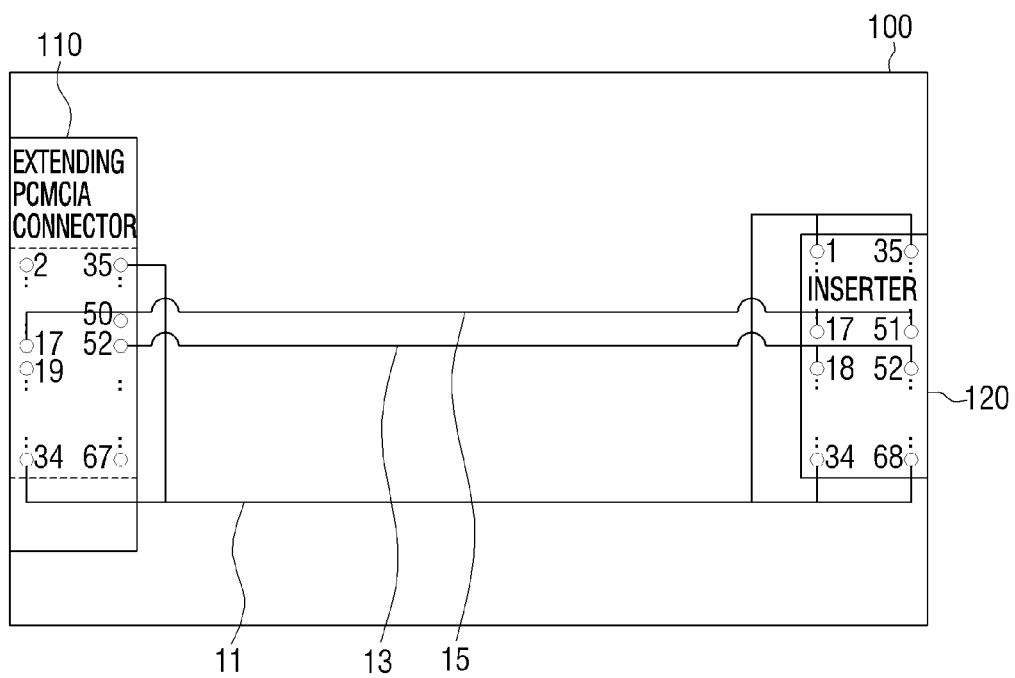
FIG. 7 is a view illustrating an exemplary embodiment of a standard PCMCIA pin area according to an exemplary embodiment.

FIG. 7 is a view illustrating an exemplary embodiment of the standard PCMCIA pin area according to an exemplary embodiment.

FIG. 7 illustrates a functionality extending kit 100 including an extending PCMCIA connector 110 and an inserter 120. In the extending PCMCIA connector 110, some pins of the standard PCMCIA pin area may be allocated to the additional pin areas. The inserter 120 may be connected to a standard PCMCIA interface on which the card may be mounted.

A method of allocating some pins of the standard PCMCIA pin area to the additional pin areas is now explained. The 68 PCMCIA interfaces that are connected to the card 300 as aforementioned are standard-based interfaces and thus standard conditions must be satisfied. However, the standard PCMCIA interfaces include a common signal line.

For example, a ground line and power line are connected to a plurality of pins of the PCMCIA connector. Therefore, connection of some of the pins of the PCMCIA connector connected to the ground line and power line may be disconnected. In the present disclosure, not only data signal lines and control signal lines, but also power lines and ground lines are regarded as signal lines in a broad sense.

For example, the ground line of the standard PCMCIA interface may be connected to pins 1, 34, 35, and 58 of the PCMCIA connector. The VCC power line may be connected to pins 17 and 51. VPP power line may be connected to pins 18 and 52. In an exemplary embodiment, the ground line of the standard PCMCIA interface that is connected to pins 1 and 68 of the PCMCIM connector is disconnected. In addition, the VCC power line that is connected to pin 18 and the VCC power line that is connected to pin 51 are disconnected. Therefore, a standard PCMCIA interface that includes 68 signal lines may consist of 64 signal lines with 2 ground lines and 2 power lines excluded.

In FIG. 7, the extending PCMCIA connector 110 may include a standard PCMCIA pin area consisting of 64 signal lines. As explained above, of the pins of the extending PCMCIA connector 110, pins 1, 18, 51, and 68 may be excluded. In FIG. 7, the pin numbers that are not connected to a signal line have been excluded for convenience of explanation, but in fact, a signal line may be connected to each pin of the extending PCMCIA connector 110, and each pin may be matched to the signal in sequential number. In other words, extending PCMCIA connector 110 pin number allocation may be sequential from no. 1 to no. 92.

Meanwhile, the card may be connected to a standard PCMCIA interface, and thus the extending PCMCIA connector 110 must be connected to the inserter 120 using a standard PCMCIA interface method. In an exemplary embodiment, pin 34 and 35 of the extending PCMCIA connector 110 that are connected to the ground signal may be combined at common ground line 11 and then connected again with pins 1, 34, 35, and 68 of the inserter. Of the pins of the extending PCMCIA connector 110, the no. 17 pin that is connected to the VPP power line 15 may be connected to pins 17 and 51 of the card slot, and pin no. 52 connected to the VPP power line 13 may be connected to pins 18 and 52 of the card slot.

In this method, an extending PCMCIA connector 110 having 92 pins may use 64 pins as the standard PCMCIA pin area and 28 pins as the additional pin areas.

For example, the additional pin areas may be allocated to the standby power line, clock signal line, data signal line and control signal line for USB communication, data signal line and control signal line for Multimedia Over Coax Alliance (MoCA) communication, data transmission line and control signal line for communication with other devices, wake on signal line for turning on the display apparatus when a circuit board is used in the additional apparatus, sense signal line for sensing connection between the display apparatus and additional apparatus, ground signal line, etc.

Figure 8:
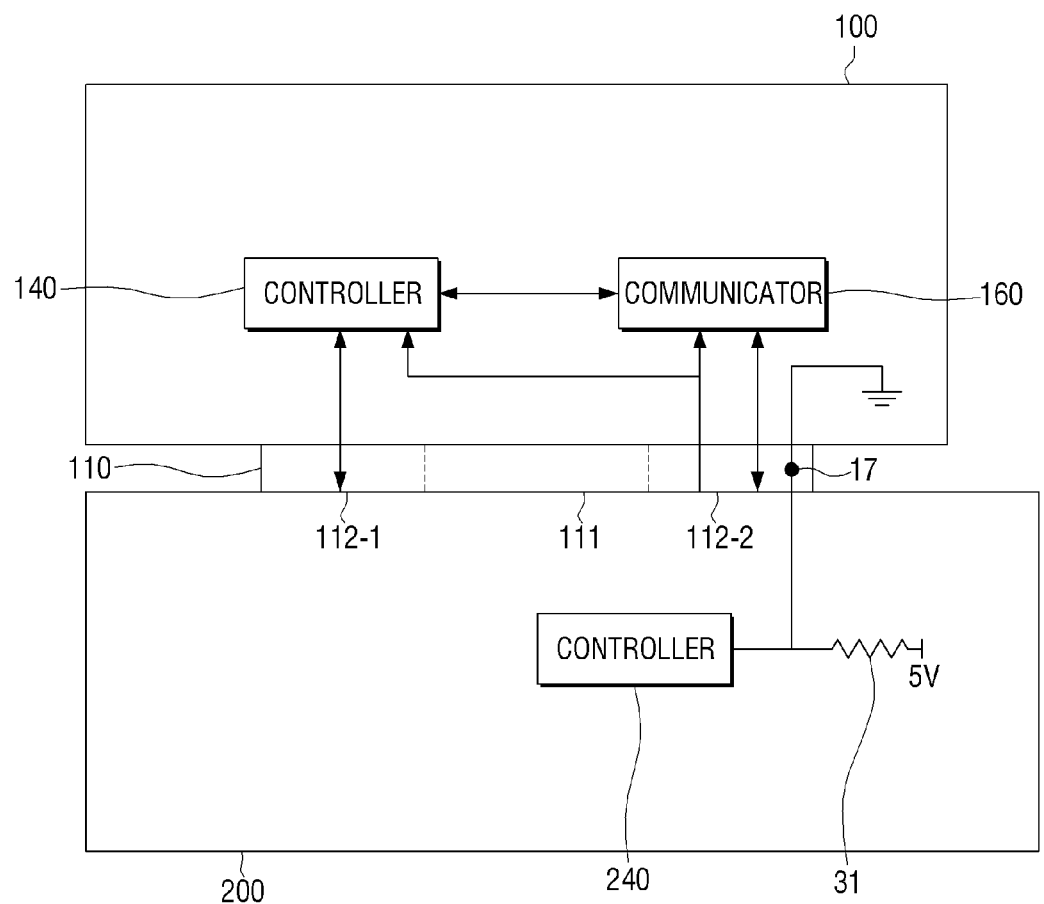
FIG. 8 is a view illustrating operation of a functionality extending kit of a display apparatus according to an exemplary embodiment.

FIG. 8 is a view illustrating the operation of a functionality extending kit of a display apparatus according to an exemplary embodiment.

In an embodiment shown in FIG. 8, the functionality extending kit 100 includes a communicator 160. As aforementioned, the communicator 160a may be at least one of MoCA (Multimedia over Coax Alliance), power line communication modem, a LAN card, or the like. Therefore, the functionality extending kit 100 may be connected to a network such as, for example, MoCA (Multimedia over Coax Alliance), power line communication Local Area Network, etc.

The controller 140 and communicator 160 of the functionality extending kit 100 may receive standby power from the display apparatus 200 through the additional pin area 112-2 of the extending PCMCIA connector 110. The controller 140 may receive a command to connect to a network through the additional pin area 112-1 from the display apparatus 200. The communicator 160 may connect to the network under the control of the controller 140. The communicator 160, having been connected to the network, may transmit data received from the display apparatus 200 through the additional pin area 112-2 of the extending PCMCIA connector 110 to a server, may transmit data received from the display apparatus 200 to the server through the network, and may transmit data received through the network to the display apparatus 200.

In an exemplary embodiment, the additional pin area 112-2 may include a functionality extending kit sensing pin 17. The sensing pin 17 of the functionality extending kit 100 may be connected to the ground signal line. The sensing pin 17 of the display apparatus 200 may be connected to the pull-up resistance 31 and the signal line between the power line and the input terminal of the controller 240.

When the functionality extending kit 100 is not connected, the controller 240 of the display apparatus 200 may be connected to the power line and a high signal may be input thereto. Therefore, the display apparatus 200 may sense that the functionality extending kit 100 is not connected. When the functionality extending kit 100 is connected, the power line of the display apparatus 200 may be connected to the ground, and a low signal may be input to the controller 240. Therefore, the display apparatus 200 may sense that the functionality extending kit 100 is connected.

Although not illustrated, in the additional pin areas 112-1, 112-2, a wake on pin of the display apparatus 200 may be included. When the functionality extending kit 100 receives a command to turn on the display apparatus 200 according to certain conditions, it may transmit a signal to the display apparatus 200 through the wake on pin. By turning on the power, the display apparatus 200 that received the signal may be wake up.

Figure 9:
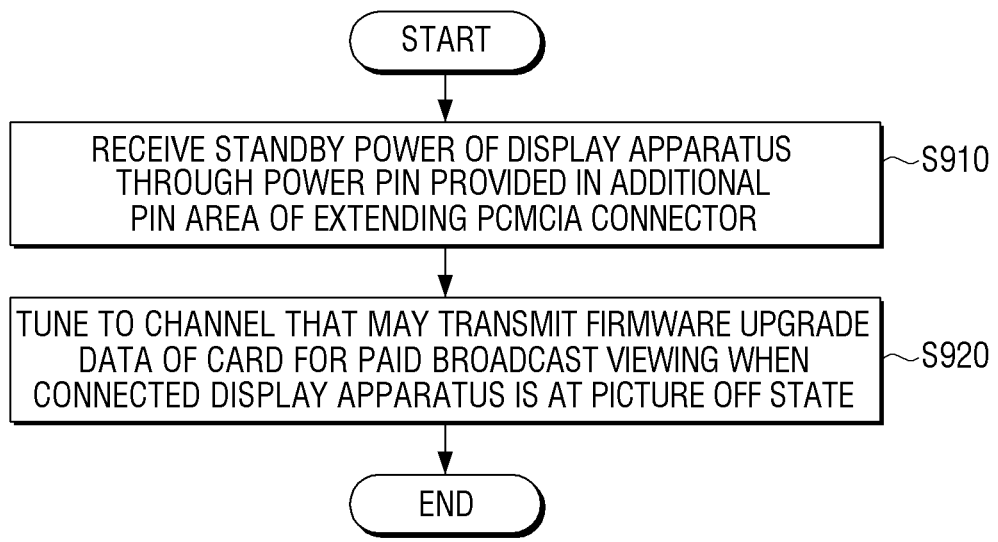
FIG. 9 is a flowchart of a control method of a functionality extending kit of a display apparatus according to an exemplary embodiment.

FIG. 9 is a flowchart of a method of controlling a functionality extending kit of a display apparatus according to an exemplary embodiment.

With reference to FIG. 9, the functionality extending kit may receive standby power of the display apparatus 200 through the power pin provided in the additional pin area of the extending PCMCIA connector 110 (S910). The extending PCMCIA 110 may include a standard PCMCIA pin area 111 and additional pin areas 112-1, 112-2. The standard PCMCIA pin area 111 may be allocated for operations related to scrambled broadcasting contents and the additional pin areas 112-1, 112-2 may be allocated for additional operations. Therefore, the functionality extending kit 100 may transmit broadcasting contents and data related to additional functions to the display apparatus 200 using a single connector. In an exemplary embodiment, the functionality extending kit 100 may not include its own power, but may operate with low power as it is driven using standby power received from the display apparatus 200.

The functionality extending kit 100 may tune to a channel that transmits firmware upgrade data for paid broadcast viewing associated with the card 300 when the connected display apparatus 200 is at a picture off state (S920). The functionality extending kit 100 may be controlled by the display apparatus 200 at a picture on state.

Figure 10:
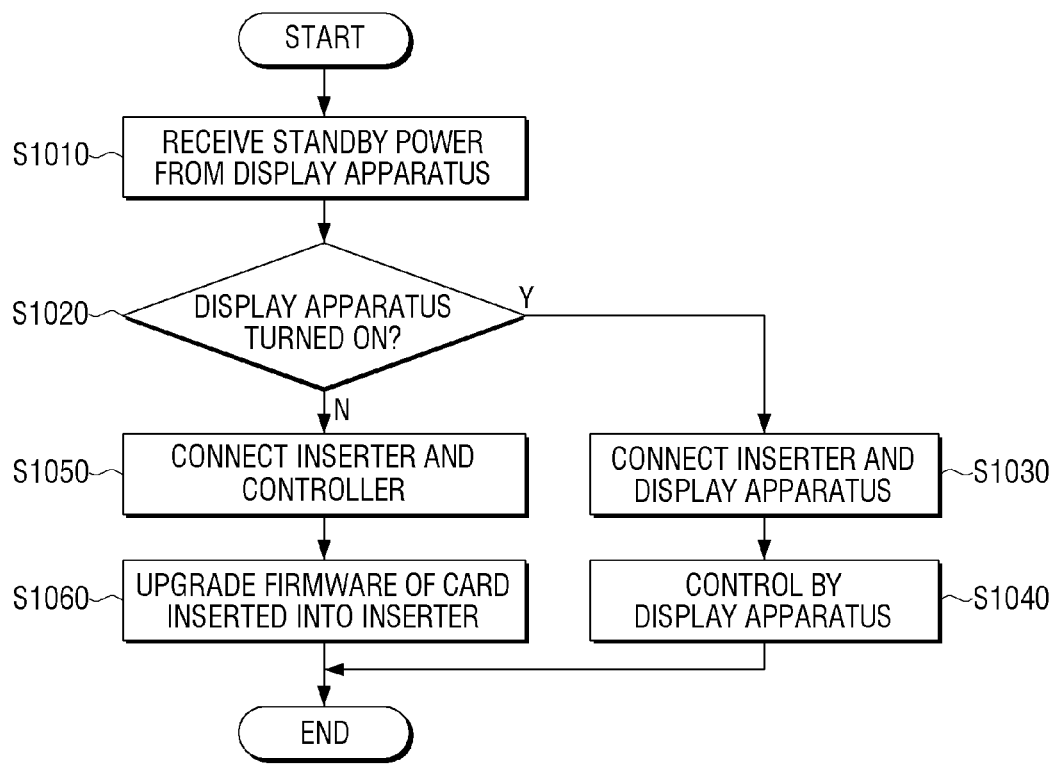
FIG. 10 is a flowchart of a control method of a functionality extending kit of a display apparatus according to an exemplary embodiment.

FIG. 10 is a flowchart of a controlling method of a functionality extending kit of the display apparatus according to an exemplary embodiment.

The functionality extending kit 100 may receive standby power from the display apparatus 200 (S1010). The functionality extending kit 100 may determine whether or not the display apparatus 200 is at a picture on state (S1020). The picture on state may refer to a state where contents are displayed on the display unit, and the picture off state may refer to a state where power is supplied to certain parts of the display apparatus (for example, a controller and sensor).

When it is determined that the display apparatus 200 is at a picture on state, the functionality extending kit 100 may connect the inserter 120 and the display apparatus 200 (S1030). That is, since the card 300 is inserted into the inserter 120, the card 300 and the display apparatus 200 are connected to each other.

The functionality extending kit 100 may be controlled by the display apparatus 200 (S1040). Broadcasting contents descrambled in the card 300 by the clock and read signal provided from the display apparatus may be transmitted to the display apparatus.

When it is determined that the display apparatus 200 is at a picture off state, the functionality extending kit 100 may connect the inserter 120 and the controller 140 (S1050). That is, the card 300 inserted into the inserter 120 and the controller 140 of the functionality extending kit 100 may be connected to each other. The functionality extending kit 100 may upgrade the firmware of the card 300 inserted into the inserter 120 (S1060).

A method of controlling the functionality extending kit 100 of the display apparatus 200 according to various exemplary embodiments explained above may be embodied as a program and be provided to the functionality extending kit 100.

For example, there may be provided a non-transitory computer readable medium upon which is stored a program performing a step of tuning to a channel that may provide firmware update data associated with a card 300, thereby enabling paid broadcasting viewing when the display apparatus 200 is supplied with standby power through a power pin provided in an additional pin areas of the extending PCMCIA connector and the display apparatus connected to the extending PCMCIA connector is at a picture off state.

A non-transitory computer readable medium may refer to a computer readable medium that stores data semi-permanently and not a medium that stores data for a short period of time such as a carrier wave, etc. More specifically, the aforementioned various applications or programs may be stored in a non-transitory computer readable medium such as a CD, DVD, hard disk, blue ray disk, USB, memory card and ROM etc. and be provided.

Although exemplary embodiments have been shown and described, it would be appreciated by those skilled in the art that changes may be made in the exemplary embodiments without departing from the principles and spirit of the invention, the scope of which is defined in the claims and their equivalents.

What is claimed is:

1. A functionality extending kit comprising:
   a receiver configured to receive a card that enables paid broadcasting to be viewed on a display apparatus;
   an extending connector comprising:
      a first pin area connected to a signal line of the card; and
      an additional pin area connected to a predetermined signal line; and
   a controller configured to control a tuner to tune to a channel that transmits firmware update data associated with the card when the display apparatus is in a picture off state;
   a switch configured to switch a connection of the receiver to and from the controller and the display apparatus;
   wherein the functionality extending kit is configured to receive standby power for a firmware update of the card, from the display apparatus through a pin provided in the additional pin area.

2. The functionality extending kit according to claim 1, wherein:
   the tuner is configured to receive a scrambled broadcasting channel,
   the controller is configured to control the switch to connect the receiver to the controller in response to the display apparatus being in the picture off state and perform the update of the firmware on the card, and
   the controller is further configured to control the switch to connect the receiver to the display apparatus in response to the display apparatus being in a picture on state such that the scrambled broadcasting channel received by the tuner is provided to the card to descramble the broadcasting channel and to the display apparatus to display the descrambled channel.

3. The functionality extending kit according to claim 1, wherein the controller is configured to be controlled by the display apparatus when the display apparatus is in a picture on state.

4. The functionality extending kit according to claim 1, wherein the controller is configured to transceive a control signal to/from the display apparatus through a control pin provided in the additional pin area.

5. The functionality extending kit according to claim 1, further comprising a communicator configured to communicate with a network.

6. The functionality extending kit according to claim 5, wherein the communicator is at least one of MoCA (Multimedia over Coax Alliance), power line communication, and LAN (Local Area Network) card.

7. A functionality extending kit control method, the method comprising:
   inserting a card into a receiver of an extending connector;
   receiving standby power for a firmware update of the card, from a display apparatus through a power pin provided in an additional pin area of the extending connector;
   tuning to a channel that transmits firmware update data associated with the card which enables paid broadcasting to be viewed when the display apparatus is in a picture off state; and
   connecting the receiver to which the card is inserted to one of a controller of the extending connector and the display apparatus.

8. The method according to claim 7,
   wherein the connecting comprises selectively connecting the receiver to the controller in response to the display apparatus being in the picture off state, and selectively connecting the receiver to the display apparatus in response to the display apparatus is in a picture on state.

9. The method according to claim 7,
   further comprising being controlled by the display apparatus when the display apparatus is in a picture on state.

10. The method according to claim 7,
    further comprising transceiving a control signal to/from the display apparatus through a control pin provided in the additional pin area.

11. The method according to claim 7,
    further comprising communicating with a network using at least one of MoCA (Multimedia over Coax Alliance), power line communication, and LAN (Local Area Network).

12. A functionality extending kit comprising:
    a connector configured to be attached to a display apparatus;
    a receiver configured to receive a card that enables paid broadcasting to be viewed on the display apparatus;

a tuner configured to tune to a channel which transmits firmware update data associated with the card; and a switch configured to switch a connection of the receiver to and from the controller and the display apparatus, wherein the functionality extending kit is configured to obtain the firmware update data while receiving standby power from the display apparatus.

13. The functionality extending kit of claim 12, further comprising:

a power unit configured to receive standby power from the display apparatus when the display apparatus is in a picture off state.

14. The functionality extending kit of claim 13, wherein the standby power is received through a power pin provided in an additional pin area of an extending connector.

15. The functionality extending kit of claim 14, wherein the extending connector comprises a personal computer memory card international association (PCMCIA) connector.

16. The functionality extending kit of claim 12, further comprising:

a decoder configured to decode a scrambled signal received at the tuner.

17. The functionality extending kit of claim 12, further comprising:

a communicator configured to transmit data received from the display apparatus to a server through a network and to transmit data received through the network to the display apparatus.

18. The functionality extending kit of claim 5, wherein the communicator is configured to transmit data received from the display apparatus to a server through the network and to transmit data received through the network to the display apparatus.

19. The functionality extending kit of claim 1, wherein the receiver is an inserter into which the card is removably inserted and wherein the card is configured to descramble a scrambled channel to be broadcast by the display apparatus.

20. The functionality extending kit of claim 1, wherein the card is a personal computer memory card international association (PCMCIA) card and wherein the functionality extending kit connects the card to the display apparatus and comprises a PCMCIA interface pins for connecting to the card.

\* \* \* \* \*